United States Patent
Chen et al.

(10) Patent No.: US 12,382,452 B2
(45) Date of Patent: Aug. 5, 2025

(54) USER EQUIPMENT PROCESSING TIME FOR PHYSICAL DOWNLINK SHARED CHANNEL SCHEDULED USING DOWNLINK CONTROL INFORMATION REPETITION

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/644,971

(22) Filed: Dec. 17, 2021

(65) Prior Publication Data

US 2022/0312454 A1     Sep. 29, 2022

Related U.S. Application Data

(60) Provisional application No. 63/165,552, filed on Mar. 24, 2021.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS

2017/0289899 A1\* 10/2017 You ................... H04L 5/0007
2019/0254120 A1\*  8/2019 Zhang ................ H04W 4/80
(Continued)

OTHER PUBLICATIONS

U.S. Appl. No. 63/134,053, filed Jan. 5, 2021, Cirik et al., "Processing Time in Control Channel Repetition", Fig. 14A-B, 19-22, 24-26 and corresponding disclosure.\*

*Primary Examiner* — Gregory B Sefcheck
(74) *Attorney, Agent, or Firm* — Harrity & Harrity, LLP

(57) ABSTRACT

Various aspects of the present disclosure generally relate to wireless communication. In some aspects, a user equipment (UE) may receive a first downlink control information (DCI) repetition, for scheduling a physical downlink shared channel (PDSCH), wherein the first DCI repetition is associated with a first physical downlink control channel (PDCCH) candidate. The UE may receive a second DCI repetition associated with a second PDCCH candidate that is linked to the first PDCCH candidate for DCI repetition. The UE may transmit a feedback associated with a first symbol of a physical uplink control channel (PUCCH) based at least in part on determining a processing time and an additional processing time, wherein determining the additional processing time comprises determining the additional processing time based at least in part on a parameter associated with at least one of the first PDCCH candidate or the second PDCCH candidate. Numerous other aspects are described.

30 Claims, 10 Drawing Sheets

(51) Int. Cl.
*H04L 5/00* (2006.01)
*H04W 72/0446* (2023.01)
*H04W 72/23* (2023.01)
*H04W 72/51* (2023.01)

(52) U.S. Cl.
CPC ....... *H04W 72/0446* (2013.01); *H04W 72/23* (2023.01); *H04W 72/51* (2023.01)

(56) References Cited

U.S. PATENT DOCUMENTS

| | | | |
|---|---|---|---|
| 2021/0105809 A1* | 4/2021 | Park | H04L 27/2602 |
| 2021/0168774 A1* | 6/2021 | Li | H04W 16/14 |
| 2021/0195600 A1* | 6/2021 | Khoshnevisan | H04W 72/53 |
| 2021/0274536 A1* | 9/2021 | Shin | H04W 72/535 |
| 2021/0351865 A1* | 11/2021 | Ouchi | H04W 8/24 |
| 2022/0070901 A1* | 3/2022 | Muruganathan | H04L 5/0094 |
| 2022/0174706 A1* | 6/2022 | Saber | H04W 72/21 |
| 2022/0191903 A1* | 6/2022 | Bae | H04L 1/1893 |
| 2022/0256571 A1* | 8/2022 | Lo | H04W 72/1273 |
| 2022/0286868 A1* | 9/2022 | Kim | H04L 1/06 |
| 2022/0295320 A1* | 9/2022 | Lin | H04L 5/0051 |
| 2022/0338222 A1* | 10/2022 | Kim | H04W 72/1273 |
| 2022/0345268 A1* | 10/2022 | Matsumura | H04L 1/0013 |
| 2022/0399960 A1* | 12/2022 | Bae | H04L 5/00 |
| 2023/0022763 A1* | 1/2023 | Kim | H04L 1/08 |
| 2023/0042391 A1* | 2/2023 | Kim | H04W 72/23 |
| 2023/0076897 A1* | 3/2023 | Svedman | H04W 72/23 |
| 2023/0096674 A1* | 3/2023 | Fu | H04W 72/23 370/329 |
| 2023/0147122 A1* | 5/2023 | Canonne-Velasquez | H04L 5/005 370/329 |
| 2023/0198721 A1* | 6/2023 | Gao | H04L 5/0082 370/329 |
| 2023/0199773 A1* | 6/2023 | Cirik | H04L 1/1854 370/329 |
| 2024/0089061 A1* | 3/2024 | Gao | H04L 5/0098 |
| 2024/0147492 A1* | 5/2024 | Gao | H04L 1/08 |

* cited by examiner

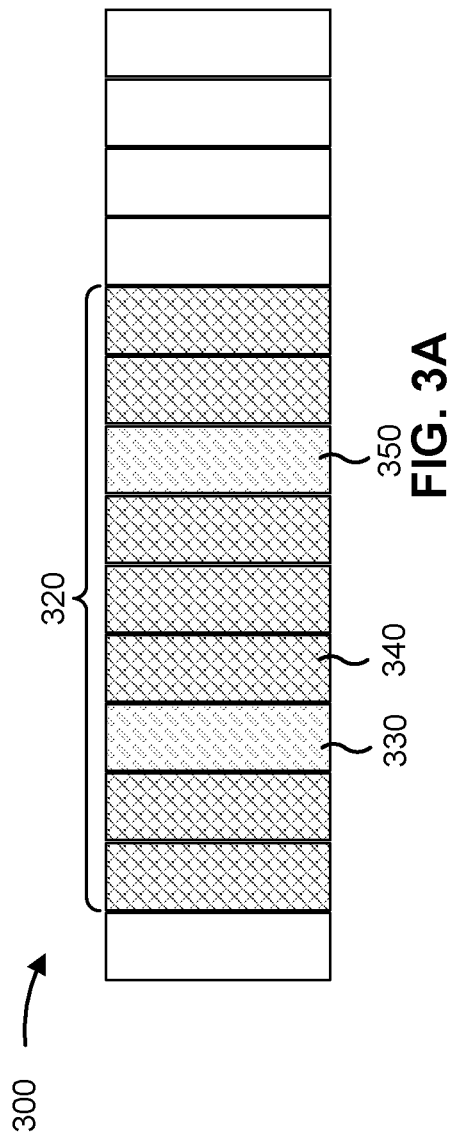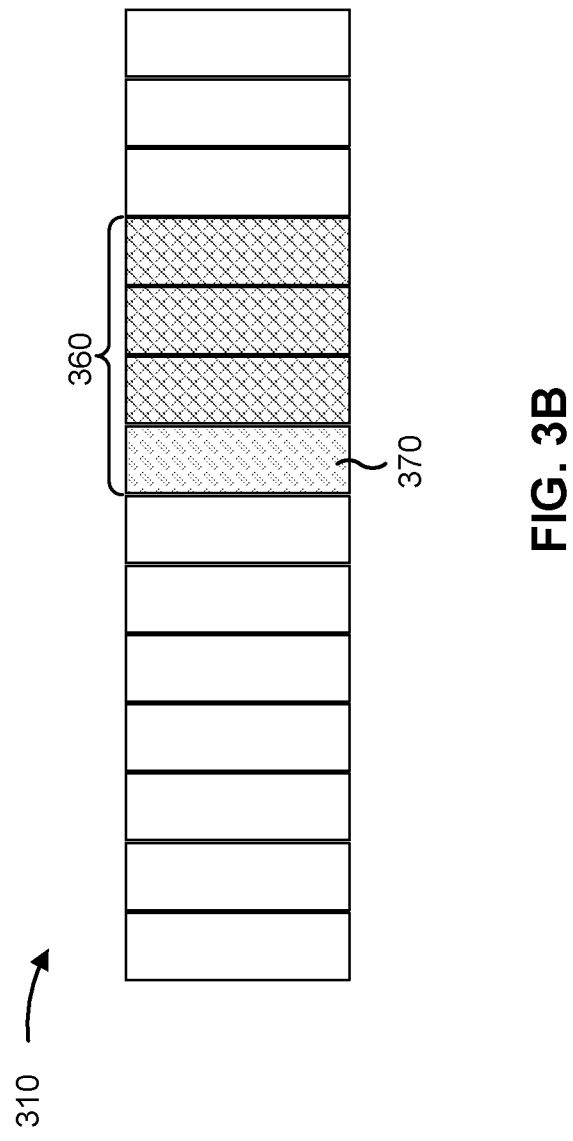

USER EQUIPMENT PROCESSING TIME FOR PHYSICAL DOWNLINK SHARED CHANNEL SCHEDULED USING DOWNLINK CONTROL INFORMATION REPETITION

CROSS-REFERENCE TO RELATED APPLICATION

This patent application claims priority to U.S. Provisional Patent Application No. 63/165,552, filed on Mar. 24, 2021, entitled "USER EQUIPMENT PROCESSING TIME FOR PHYSICAL DOWNLINK SHARED CHANNEL SCHEDULED USING DOWNLINK CONTROL INFORMATION REPETITION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for user equipment processing time for physical downlink shared channel scheduled using downlink control information repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive a first downlink control information (DCI) repetition, for scheduling a physical downlink shared channel (PDSCH), wherein the first DCI repetition is associated with a first physical downlink control channel (PDCCH) candidate; receive a second DCI repetition associated with a second PDCCH candidate that is linked to the first PDCCH candidate for DCI repetition; and transmit a hybrid automatic repeat request (HARD) acknowledgement (HARQ-ACK) feedback associated with a first symbol of a physical uplink control channel (PUCCH) based at least in part on determining a processing time and an additional processing time, wherein determining the additional processing time comprises determining the additional processing time based at least in part on a parameter associated with at least one of the first PDCCH candidate or the second PDCCH candidate.

In some aspects, a method of wireless communication performed by a UE includes receiving a first DCI repetition, for scheduling a PDSCH, wherein the first DCI repetition is associated with a first PDCCH candidate; receiving a second DCI repetition associated with a second PDCCH candidate that is linked to the first PDCCH candidate for DCI repetition; and transmitting a HARQ-ACK feedback associated with a first symbol of a PUCCH based at least in part on determining a processing time and an additional processing time, wherein determining the additional processing time comprises determining the additional processing time based at least in part on a parameter associated with at least one of the first PDCCH candidate or the second PDCCH candidate.

In some aspects, a non-transitory computer-readable medium storing a set of instructions for wireless communication includes one or more instructions that, when executed by one or more processors of a UE, cause the UE to: receive a first DCI repetition, for scheduling a PDSCH, wherein the first DCI repetition is associated with a first PDCCH candidate; receive a second DCI repetition associated with a second PDCCH candidate that is linked to the first PDCCH candidate for DCI repetition; and transmit a HARQ-ACK feedback associated with a first symbol of a PUCCH based at least in part on determining a processing time and an additional processing time, wherein determining the additional processing time comprises determining the additional processing time based at least in part on a parameter associated with at least one of the first PDCCH candidate or the second PDCCH candidate.

In some aspects, an apparatus for wireless communication includes means for receiving a first DCI repetition, for scheduling a PDSCH, wherein the first DCI repetition is associated with a first PDCCH candidate; means for receiving a second DCI repetition associated with a second PDCCH candidate that is linked to the first PDCCH candidate for DCI repetition; means for determining a processing time and means for determining an additional processing time, wherein the means for determining the additional processing time comprise means for determining the additional processing time based at least in part on a parameter associated with at least one of the first PDCCH candidate or the second PDCCH candidate; and means for transmitting a HARQ-ACK feedback associated with a first symbol of a PUCCH based at least in part on the processing time and the additional processing time.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A and 3B are diagrams illustrating examples of physical downlink shared channel (PDSCH) mapping types, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
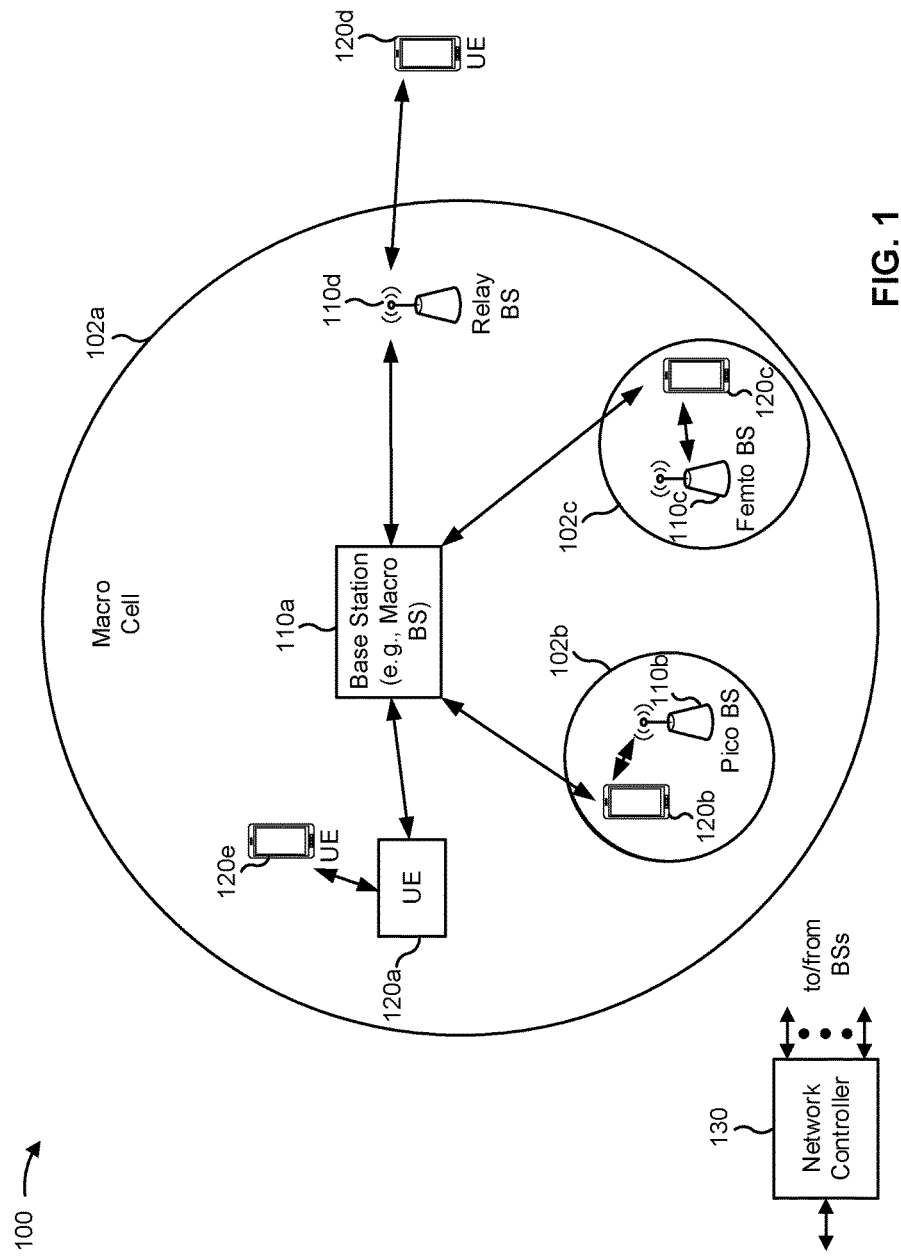
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
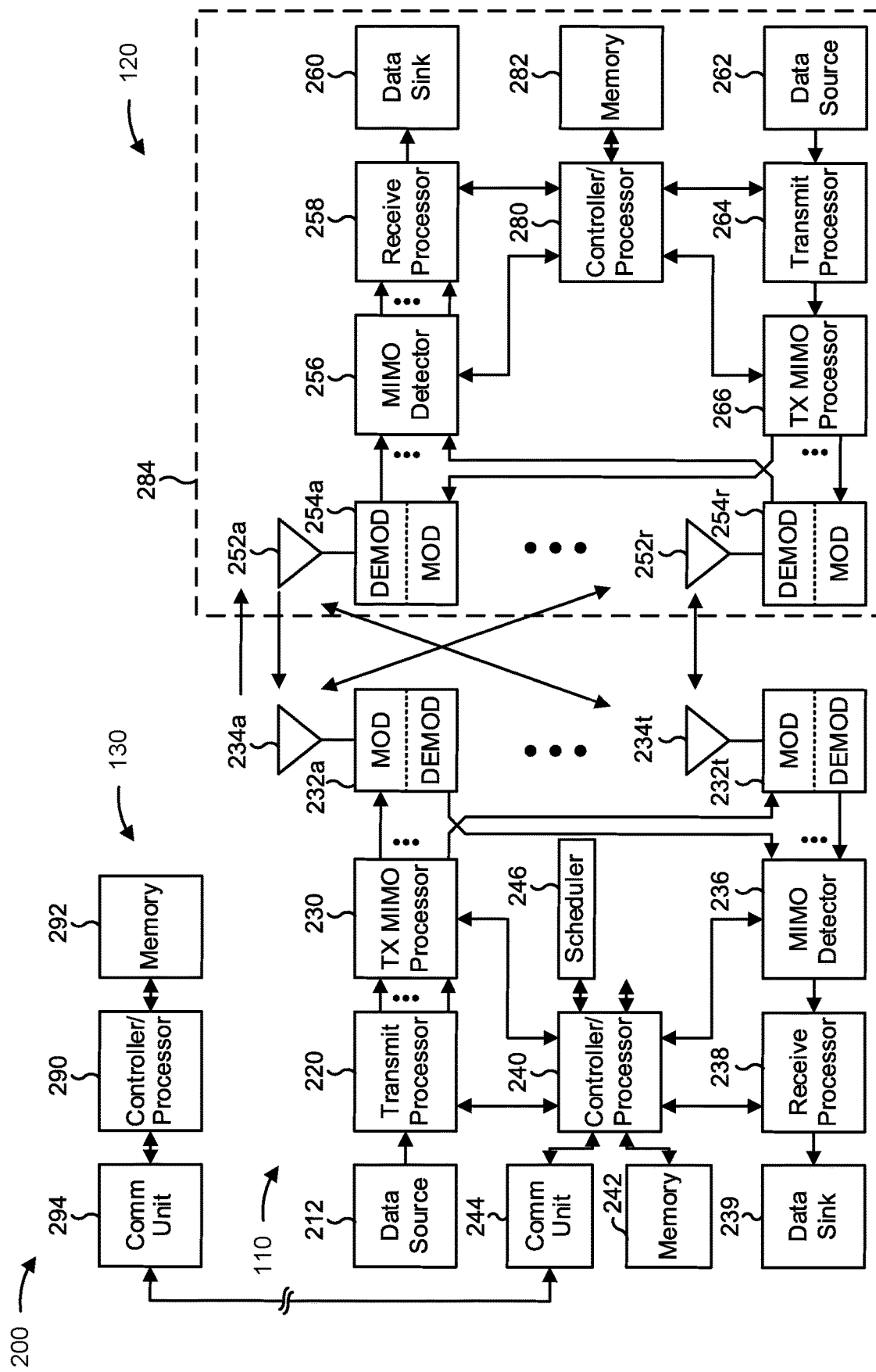
FIG. 2 is a diagram illustrating an example of a base station in communication with a user equipment (UE) in a wireless network, in accordance with the present disclosure.
Figure 4A:
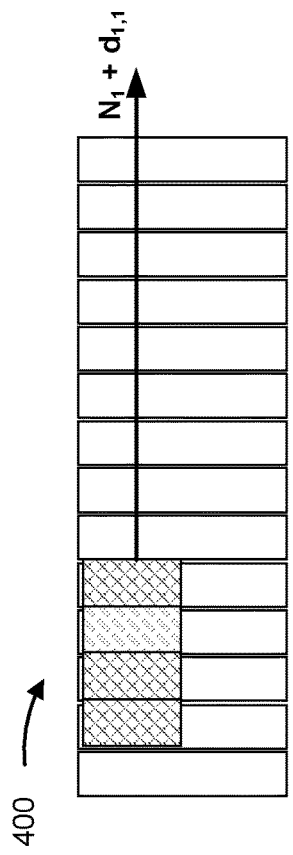
FIGS. 4A-4E are diagrams illustrating examples of UE PDSCH processing time determinations, in accordance with the present disclosure.
Figure 4B:
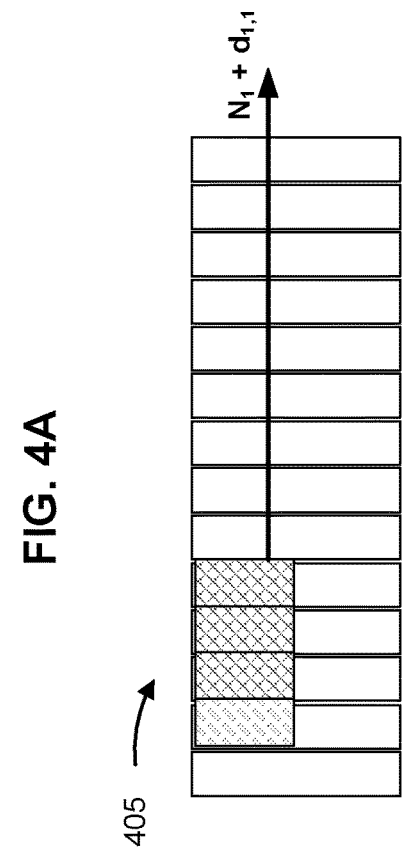
Figure 4D:
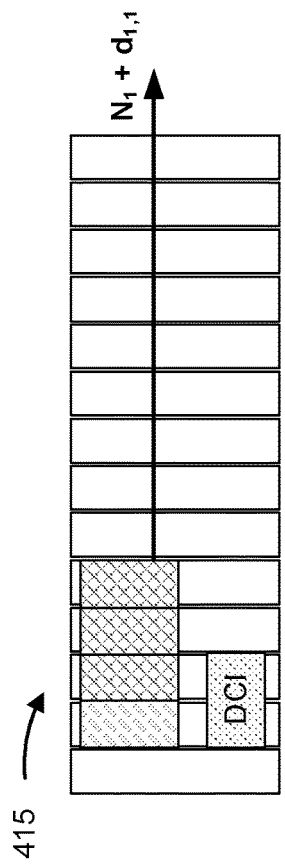
Figure 4C:
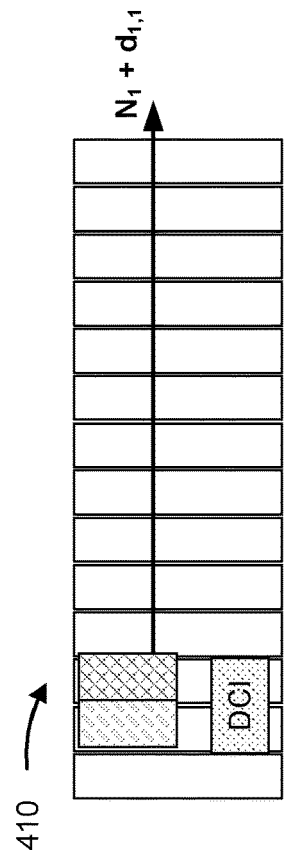
Figure 4E:
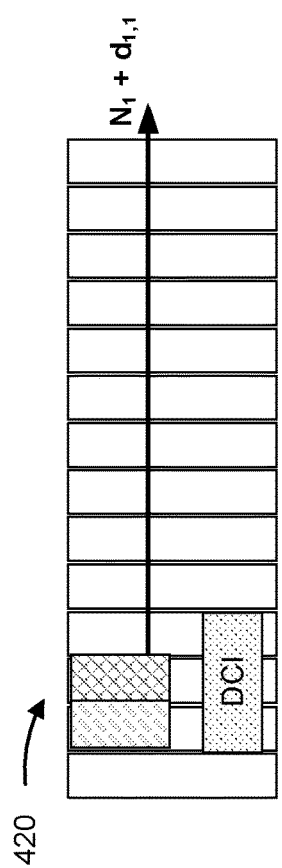

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6, 7A-7D, and 8-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6, 7A-7D, and 8-9).

Controller/processor 240 of base station 110, controller/processor 280 of UE 120, and/or any other component(s) of FIG. 2 may perform one or more techniques associated with UE processing time for physical downlink shared channel (PDSCH) scheduled using downlink control information (DCI) repetition, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some aspects, executing instructions may include running the instructions, converting the instructions, compiling the instructions, and/or interpreting the instructions, among other examples.

In some aspects, the UE includes means for receiving a first DCI repetition, for scheduling a PDSCH, wherein the first DCI repetition is associated with a first physical downlink control channel (PDCCH) candidate; means for receiving a second DCI repetition associated with a second PDCCH candidate that is linked to the first PDCCH candidate for DCI repetition; and/or means for transmitting a hybrid automatic repeat request (HARD) acknowledgement (HARQ-ACK) feedback associated with a first symbol of a physical uplink control channel (PUCCH) based at least in part on determining a processing time and an additional processing time, wherein determining the additional processing time comprises determining the additional processing time based at least in part on a parameter associated with at least one of the first PDCCH candidate or the second PDCCH candidate. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a first metric that indicates a number of overlapping symbols of the first PDCCH candidate and the PDSCH; means for determining a second metric that indicates a number of overlapping symbols of the second PDCCH candidate and the PDSCH; and/or means for evaluating a function of the first metric and the second metric.

In some aspects, the UE includes means for determining that a processing capability of the UE comprises a second type of two types; means for determining that a PDSCH mapping of the PDSCH comprises a mapping type B; means for determining that two PDSCH symbols are allocated; means for determining that the identified PDCCH candidate is associated with a three-symbol core resource set (CORESET); means for determining that the CORESET and the PDSCH have a same starting symbol; and/or means for determining that a metric corresponding to the identified PDCCH candidate partially determines the value of the parameter.

In some aspects, the UE includes means for determining that a processing capability of the UE comprises a second type; means for determining that a PDSCH mapping of the PDSCH comprises a mapping type B; means for determining that two PDSCH symbols are allocated; means for determining that the identified PDCCH candidate is associated with a three-symbol CORESET; means for determining that the CORESET and the PDSCH have a same starting symbol; and/or means for determining that a metric corresponding to the identified PDCCH candidate partially determines the value of the parameter.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIGS. 3A and 3B are diagrams illustrating examples 300 and 310 of physical downlink shared channel (PDSCH) mapping types, in accordance with the present disclosure.

Example 300 illustrates a PDSCH mapping type A. The mapping type A may be specified by a wireless communication standard. As shown, according to a mapping type A, a first demodulation reference signal (DMRS) symbol of a set 320 of PDSCH symbols in a slot may be the third symbol 330 (which may be referred to as symbol #2) of the set 320 of PDSCH symbols. In some cases, according to the mapping type A, the first DMRS symbol of the set 320 of PDSCH symbols may be the fourth symbol 340 (which may be referred to as symbol #3) of the set 320 of PDSCH symbols of the slot. As shown, the set 320 of PDSCH symbols may include one or more additional DMRS symbols 350.

The first DMRS symbol may be indicated using one bit in the master information block (MIB). In some cases, the starting symbol of the PDSCH can be symbol #0, 1, 2, or 3.

The starting symbol of the PDSCH can be indicated dynamically as part of a time domain resource assignment (TDRA) field of a DCI format.

Example 310 illustrates a PDSCH mapping type B. The mapping type B may be specified by a wireless communication standard. As shown, according to the mapping type B, the first DMRS symbol of a set 360 of PDSCH symbols may be the first symbol 370 of the set 360 of PDSCH symbols. According to the PDSCH mapping type B, the starting symbol of the PDSCH may be any symbol of the slot other than the last symbol.

As indicated above, FIGS. 3A and 3B are provided as examples. Other examples may differ from what is described with regard to FIGS. 3A and 3B.

FIGS. 4A-4E are diagrams illustrating examples 400, 405, 410, 415, and 420 of UE PDSCH processing time determinations, in accordance with the present disclosure.

A wireless communication standard (e.g., the 3GPP standard) may specify procedures for UE PDSCH processing time. The wireless communication standard may indicate that a UE requires the sum of a processing time ($N_1$ symbols) and an additional processing time ($d_{1,1}$ symbols) between the last symbol of a PDSCH received by the UE and the first symbol of a PUCCH that carries a HARQ-ACK corresponding to the PDSCH. The processing time $N_1$ depends on a UE capability (e.g., a processing capability 1 or a processing capability 2), subcarrier spacing, and, in the case of processing capability 1, whether additional DMRS symbols are configured.

The additional processing time $d_{1,1}$ is dependent on a number of different factors such as, for example, a PDSCH mapping type (e.g., mapping type A or mapping type B), a UE processing capability (e.g., a processing capability 1 or a processing capability 2), the PDSCH length (L), and/or a number of overlapping symbols of the scheduling PDCCH and the scheduled PDSCH, among other examples. The UE PDSCH processing time $N_1+d_{1,1}$ symbols after the end of the PDSCH includes the time for decoding the DCI scheduling the PDSCH, receiving the PDSCH and decoding the transport block (TB), and preparing a HARQ-ACK payload to transmit on the PUCCH.

In some cases, the additional processing time $d_{1,1}$ may be determined based on a set of rules, as illustrated by the Examples 400, 405, 410, 415, and 420. In Examples 400, 405, 410, 415, and 420, symbols of a slot are shown, and the PDSCH is indicated by cross-hatching.

Example 400 illustrates a rule that states that, for the PDSCH mapping type A, if the last symbol of the PDSCH is on the i-th symbol of the slot where i<7, then $d_{1,1}=7-i$, and otherwise $d_{1,1}=0$. Thus, for example, as shown in Example 400, since the last symbol of the PDSCH is on the fifth symbol, the additional processing time $d_{1,1}=7-i=7-5=2$ symbols.

Example 405 illustrates a set of rules corresponding to the UE processing capability 1. According to those rules, if the PDSCH is mapping type B, and if the number of PDSCH symbols allocated is L≥7, then the additional processing time $d_{1,1}=0$; if the number of PDSCH symbols allocated is L≥4 and L≤6, then the additional processing time $d_{1,1}=7-L$; and if the number of PDSCH symbols allocated is L=3, then the additional processing time $d_{1,1}=3+\min(d, 1)$, where d is the number of overlapping symbols of the scheduling PDCCH and the scheduled PDSCH. Thus, as shown in the Example 405, since the number of PDSCH symbols allocated is L=4, the additional processing time $d_{1,1}=7-L=7-4=3$ symbols.

Example 410 illustrates a rule corresponding to the UE processing capability 1. According to that rule, if the PDSCH is mapping type B, and if the number of PDSCH symbols allocated is 2, then the additional processing time $d_{1,1}=3+d$, where d is the number of overlapping symbols of the scheduling PDCCH and the scheduled PDSCH. Thus, as shown in the Example 410, since the number of symbols allocated is 2 and the number of overlapping symbols also is 2, the additional processing time $d_{1,1}=3+d=3+2=5$.

Example 415 illustrates a set of rules corresponding to the UE processing capability 2. According to those rules, if the PDSCH is mapping type B, and if the number of PDSCH symbols allocated is L≥7, then the additional processing time $d_{1,1}=0$; and if the number of PDSCH symbols allocated is L≥3 and L≤6, then the additional processing time $d_{1,1}$ is the number of overlapping symbols of the scheduling PDCCH and the scheduled PDSCH. Thus, as shown in Example 415, since the number of PDSCH symbols allocated is L=4 and the number of overlapping symbols is 2, the additional processing time $d_{1,1}=2$ symbols.

Example 420 illustrates another set of rules corresponding to UE processing capability 2. According to those rules, if the PDSCH is mapping type B, and if the number of PDSCH symbols allocated is 2, and if the scheduling PDCCH was in a 3-symbol CORESET and the CORESET and the PDSCH had the same starting symbol, then the additional processing time $d_{1,1}=3$; and otherwise, the additional processing time $d_{1,1}$ is the number of overlapping symbols of the scheduling PDCCH and the scheduled PDSCH. Thus, as shown in Example 420, since the number of PDSCH symbols is 2, and the scheduling PDCCH was in a 3-symbol CORESET and the CORESET and the PDSCH had the same starting symbol, then the additional processing time $d_{1,1}=3$.

As indicated above, FIGS. 4A-4E are provided as examples. Other examples may differ from what is described with regard to FIGS. 4A-4E.

Figure 5:
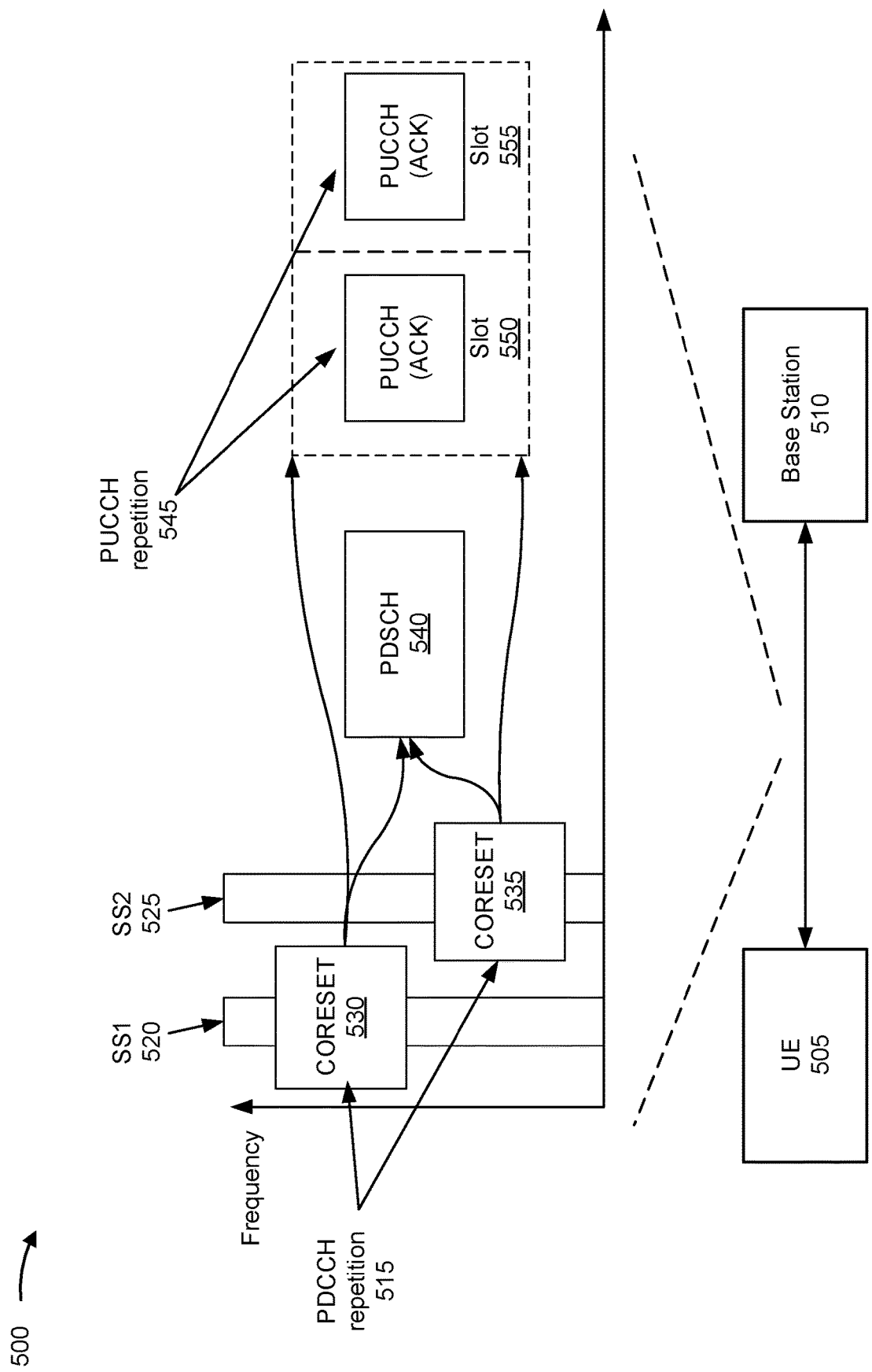
FIG. 5 is a diagram illustrating an example of wireless communications including channel repetitions, in accordance with the present disclosure.

FIG. 5 is a diagram illustrating an example 500 of wireless communications including channel repetitions, in accordance with the present disclosure. As shown in FIG. 5, a UE 505 and a base station 510 may communicate with one another. The UE 505 and the base station 510 may communicate with one another via a wireless network (e.g., the wireless network 100 shown in FIG. 1).

As shown, the base station 510 may repeat a transmission of a PDCCH communication, which may be referred to as a PDCCH repetition 515. As used herein, "repetition" refers to a communication that is transmitted more than one time and refers to the initial transmission of that communication or any subsequent retransmission of that communication. The PDCCH repetition 515 may include, for example, a DCI repetition. A repetition may be used to increase a signal-to-noise ratio (SNR) to improve transmission reliability.

The PDCCH repetition 515 may be repeated over a number of search space sets 520, 525. Each PDCCH repetition 515 may be associated with a different CORESET 530 and 535, respectively. The CORESETs 530 and 535 may be associated with different search space sets 520 and 525, a same search space set 520 or 525, or different slots. Each PDCCH repetition 515 may be associated with a PDSCH communication 540. For example, the PDCCH repetitions 515 may include DCI that schedules and/or triggers the PDSCH communication 540. In some aspects, the PDSCH communication 540 may be a PDSCH repetition of a number of PDSCH repetitions. Similarly, as shown, the UE 505 may repeat a transmission of a PUCCH communication, which may be referred to as a PUCCH repetition 545. The PUCCH repetitions 545 may be transmitted over a number of slots 550 and 555. In some cases, as indicated by "ACK," the PUCCH repetitions 545 may carry acknowledgement indicators associated with the PDCCH repetitions 515. In some aspects, any number of repetitions of a communication may be transmitted.

In some cases, where PDCCH repetition is used, each repetition may be a PDCCH candidate, and two PDCCH candidates (e.g., repetitions 515) can be linked together for possible repetition of the same DCI. As shown in FIG. 5, two PDCCH candidates in different search space sets 520 and 525 (associated with corresponding CORESETs) can be linked together for PDCCH repetition. For example, a search space set with index 2 may be linked with a search space set with index 4. If the two linked search space sets are associated with different CORESETs, and the transmission configuration indicator (TCI) state is configured and/or activated per CORESET, different PDCCH repetitions can be transmitted and/or received with different TCI states, thereby enabling beam and/or multi-TRP diversity.

In some cases, each search space set 520 and 525 has different monitoring occasions (MOs) within a slot and/or across slots. For PDCCH repetition, an MO of the first search space set 520 may be associated and/or linked with an MO of the second search space set 525. Depending on the search space set configuration with respect to monitoring occasions, PDCCH repetition can be time domain multiplexed and/or frequency domain multiplexed. In the case of PDCCH repetition, PDSCH processing time may be calculated based on either PDCCH repetition, which may introduce ambiguity as the base station may not determine UE PDSCH processing time with reference to the same repetition. As a result, the UE and the base station may not use the same reference symbol for determining UE PDSCH processing time. Thus, PDCCH repetition may cause a UE and a base station to communicate according to a timing that does not allow for UE PDSCH processing, which may cause lost communications and/or errors in decoding communications, thereby having a negative impact on network performance.

Some aspects of the techniques and apparatuses described herein provide for determining additional processing time for a PDSCH in PDCCH repetition implementations by defining event timing in terms of reference repetition occasions. In some aspects, a UE may receive a first DCI repetition associated with a first PDCCH candidate and a second DCI repetition associated with a second PDCCH candidate. The UE may determine a processing time and an additional processing time. The UE may determine the additional processing time based at least in part on a parameter associated with at least one of the first PDCCH candidate or the second PDCCH candidate. In this way, aspects may facilitate UE PDSCH processing time determination that is unambiguous between the UE and the base station, thereby reducing the chance of lost communication and/or errors in decoding communications. As a result, such aspects have a positive impact on network performance.

As indicated above, FIG. 5 is provided as an example. Other examples may differ from what is described with regard to FIG. 5.

Figure 6:
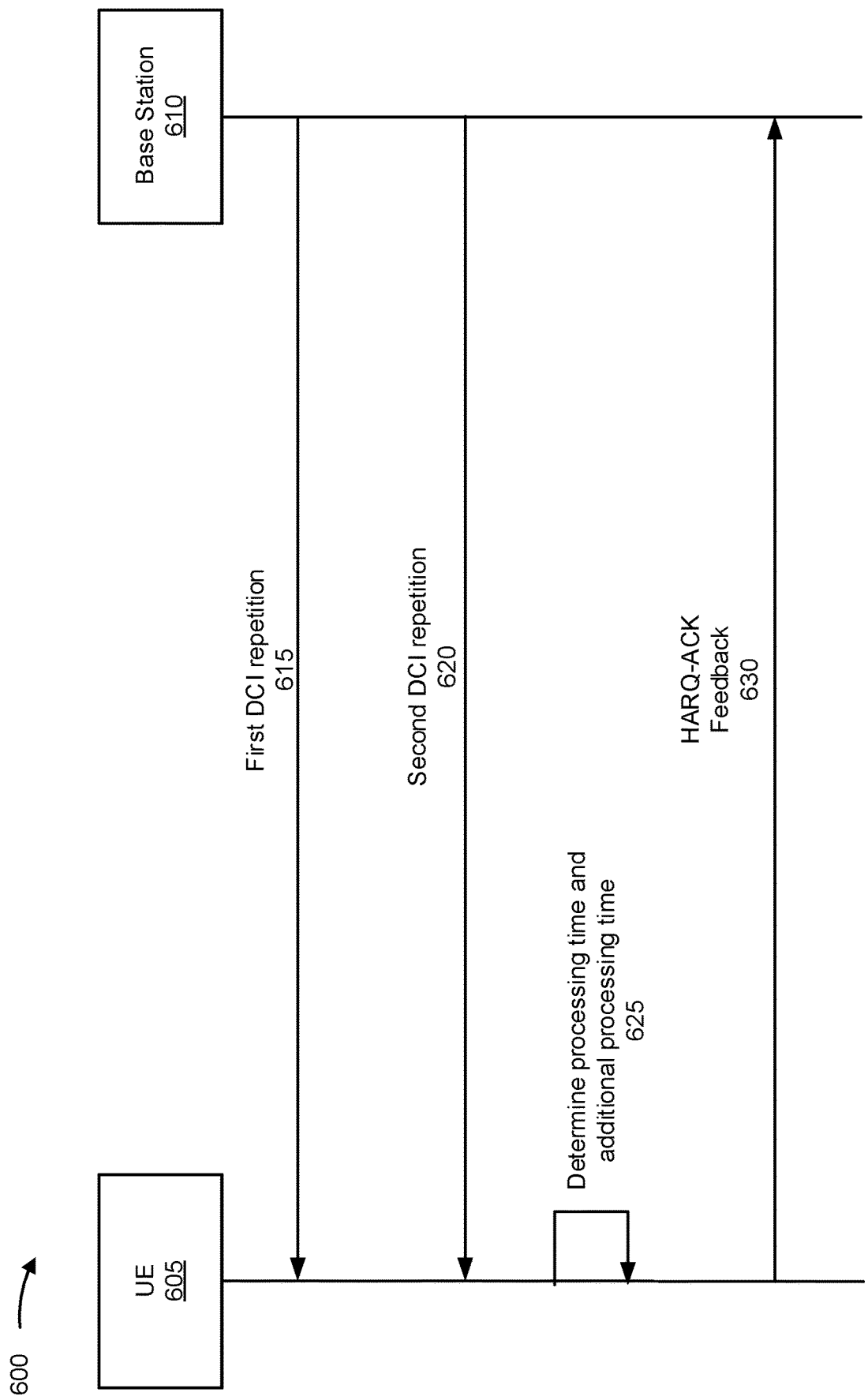
FIGS. 6 and 7A-7D are diagrams illustrating examples associated with UE processing time for a PDSCH scheduled using downlink control information (DCI) repetition, in accordance with the present disclosure.
Figure 7A:
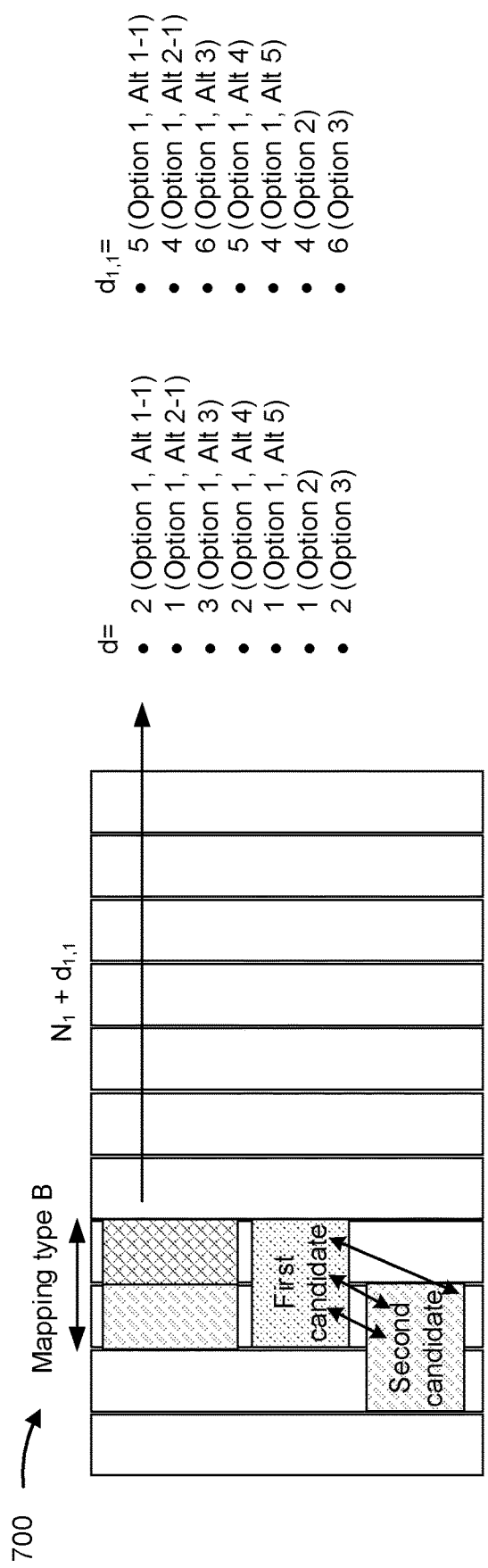
Figure 7B:
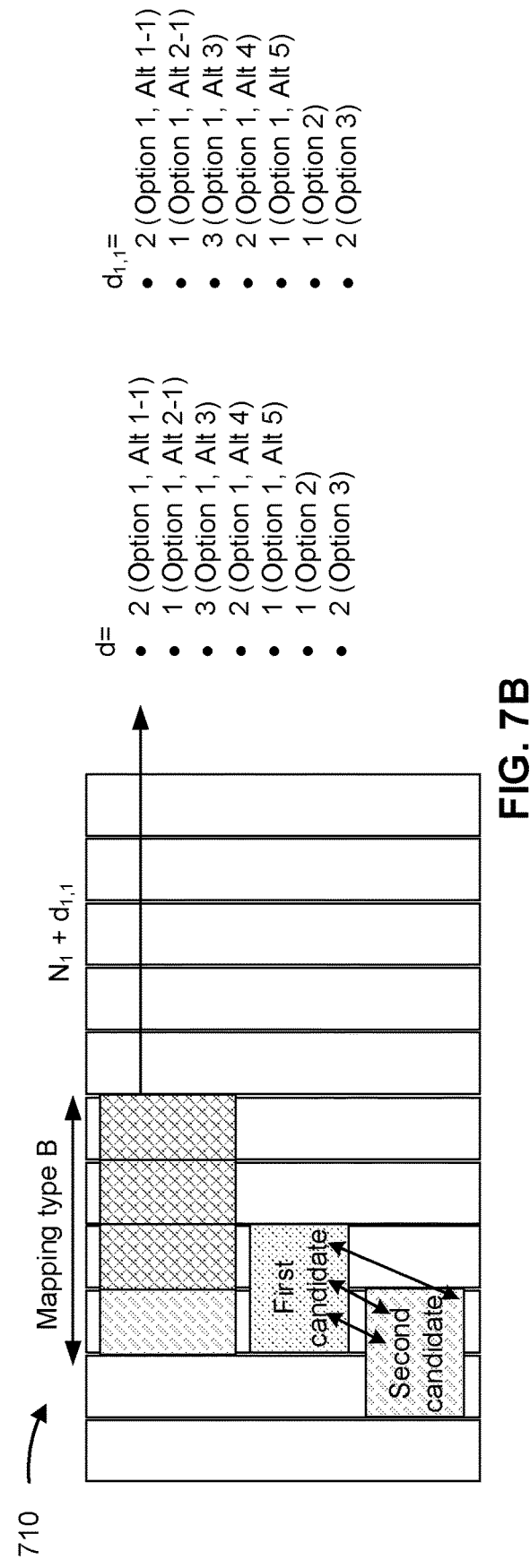
Figure 7C:
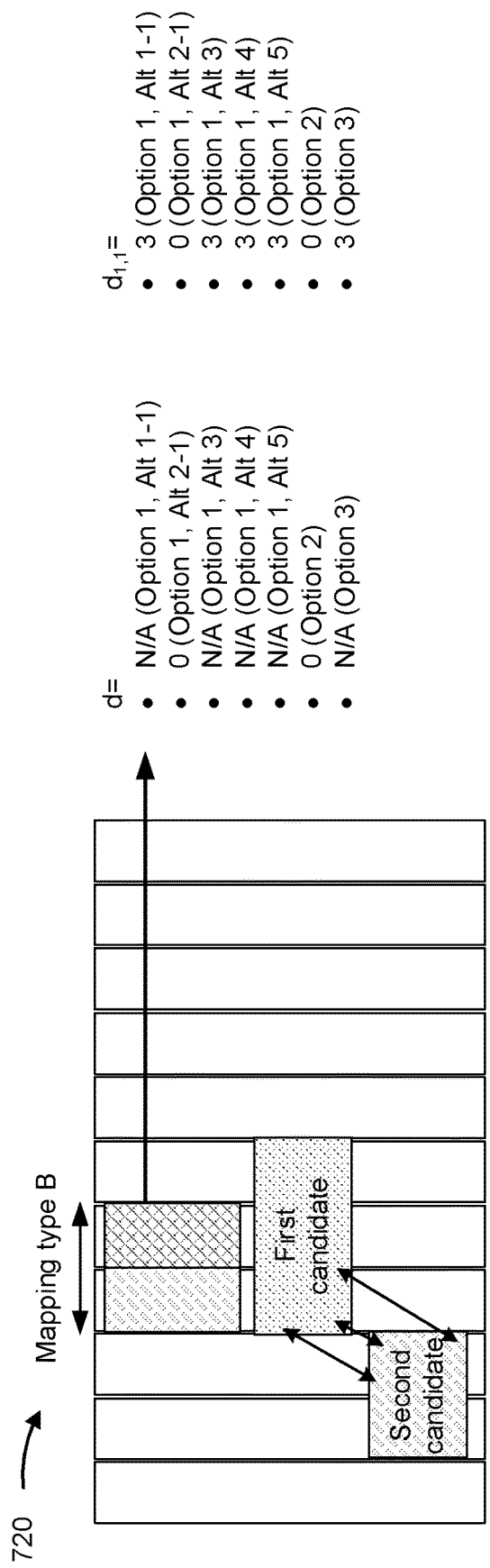
Figure 7D:
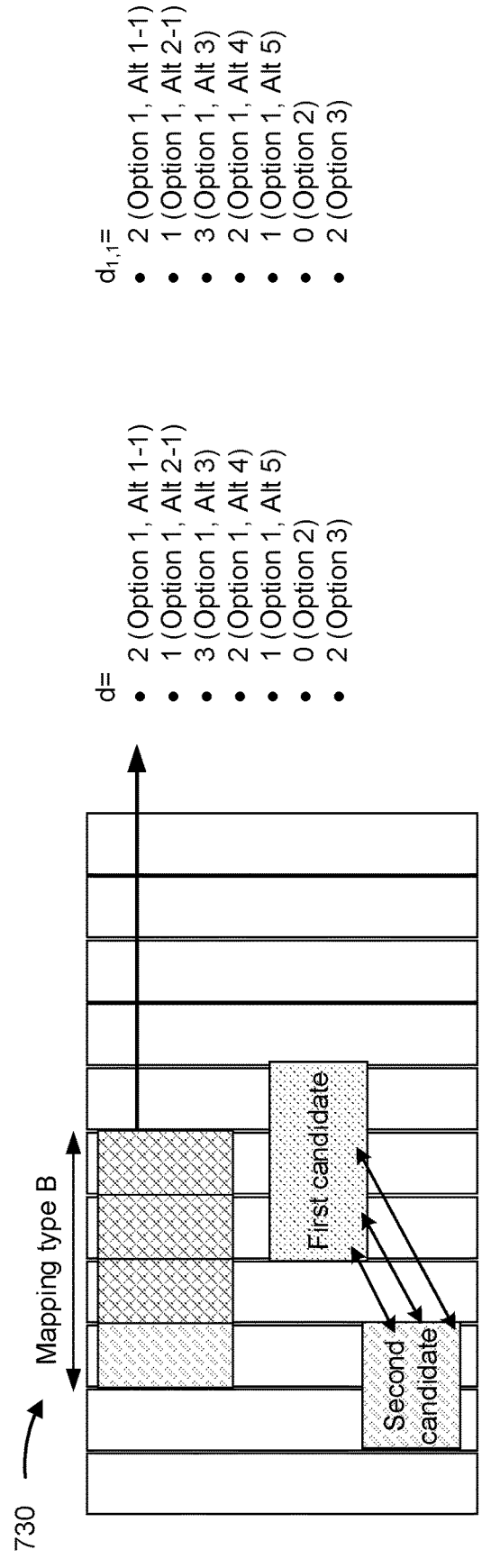

FIG. 6 is a diagram illustrating an example 600 associated with UE processing time for a PDSCH scheduled using DCI repetition, in accordance with the present disclosure. As shown, a UE 605 and a base station 610 may communicate with one another. The UE 605 and the base station 610 may communicate with one another via a wireless network (e.g., the wireless network 100 shown in FIG. 1).

As shown by reference number 615, the base station 610 may transmit, and the UE 605 may receive, a first DCI repetition for scheduling a PDSCH. The first DCI repetition may be associated with a first PDCCH candidate. As shown by reference number 620, the base station 610 may transmit, and the UE 605 may receive, a second DCI repetition associated with a second PDCCH candidate that is linked to the first PDCCH candidate for DCI repetition.

As shown by reference number 625, the UE 605 may determine the additional processing time. Determining the additional processing time may comprise determining the additional processing time $d_{1,1}$ based at least in part on a parameter, d, associated with at least one of the first PDCCH candidate or the second PDCCH candidate. In some aspects, the UE 605 may determine the additional processing time based at least in part on determining the value of the parameter d. In some aspects, the UE 605 may determine the value of the parameter d by determining a first metric, $d^1$, that indicates a number of overlapping symbols of the first PDCCH candidate and the PDSCH, and determining a second metric, $d^2$, that indicates a number of overlapping symbols of the second PDCCH candidate and the PDSCH. The UE 605 may evaluate a function of the first metric $d^1$ and the second metric $d^2$ to determine the value of the parameter d.

In some aspects, the function of the first metric $d^1$ and the second metric $d^2$ may be based at least in part on an identified PDCCH candidate. For example, the UE 605 may determine the additional processing time by determining that the additional processing time $d_{1,1}=3$ symbols based at least in part on determining that a processing capability of the UE comprises a processing capability 2, a PDSCH mapping of the PDSCH comprises a mapping type B, two PDSCH symbols are allocated, the identified PDCCH candidate x is associated with a three-symbol CORESET, the CORESET and the PDSCH have a same starting symbol, and a metric $d^x$ corresponding to the identified PDCCH candidate partially determines the value of the parameter d.

In some aspects, the UE 605 may evaluate the function of the first metric $d^1$ and the second metric $d^2$ based at least in part on determining the metric, of the first metric $d^1$ and the second metric $d^2$, that corresponds to a later PDCCH candidate of the first PDCCH candidate and the second PDCCH candidate. For example, the value of the parameter d may be given by $d=d^x$, $x\in\{1,2\}$, where $d^x$ corresponds to the later PDCCH candidate. In some aspects, determining the later PDCCH candidate may include determining the PDCCH candidate, of the first PDCCH candidate and the second PDCCH candidate, that has the later starting symbol. In some aspects, determining the later PDCCH candidate may include determining the PDCCH candidate, of the first PDCCH candidate and the second PDCCH candidate, that has the later ending symbol.

In some aspects, the UE 605 may evaluate the function of the first metric d and the second metric $d^2$ based at least in part on determining the metric, of the first metric d and the second metric $d^2$, that corresponds to an earlier PDCCH candidate of the first PDCCH candidate and the second PDCCH candidate. For example, the value of the parameter d may be given by $d=d^x$, $x\in\{1,2\}$, where $d^x$ corresponds to the earlier PDCCH candidate. In some aspects, determining the earlier PDCCH candidate may include determining the PDCCH candidate, of the first PDCCH candidate and the second PDCCH candidate, that has the earlier starting symbol. In some aspects, determining the earlier PDCCH candidate may include determining the PDCCH candidate, of the first PDCCH candidate and the second PDCCH candidate, that has the earlier ending symbol.

In some aspects, the UE 605 may evaluate the function of the first metric d and the second metric $d^2$ based at least in part on determining a sum of the first metric d and the second metric $d^2$. For example, the value of the parameter d may be given by $d=d^1+d^2$. In some aspects, the UE 605 may evaluate the function of the first metric d and the second metric $d^2$ based at least in part on determining a maximum of the first metric d and the second metric $d^2$. For example, the value of the parameter d may be given by $d=\max(d^1, d^2)$. In some aspects, the UE 605 may evaluate the function of the first metric d and the second metric $d^2$ based at least in part on determining a minimum of the first metric d and the second metric $d^2$. For example, the value of the parameter d may be given by $d=\min(d^1, d^2)$.

In some aspects, the UE 605 may determine the additional processing time based at least in part on determining a number of overlapping symbols of an intersection of a first set of symbols and a second set of symbols. The first set of symbols may include a set of symbols overlapping the first PDCCH candidate and the PDSCH, and the second set of symbols may include a set of symbols overlapping the second PDCCH and the PDSCH. In some aspects, the UE 605 may determine the additional processing time based at least in part on determining a number of overlapping symbols of a union of the first set of symbols and the second set of symbols.

In some aspects, the UE 605 may determine the additional processing time based on a rule associated with a special case. In some aspects, the function of the first metric $d^1$ and the second metric $d^2$ may be based at least in part on an identified PDCCH candidate x, and the UE 605 may determine the additional processing time by determining that the additional processing time equals three symbols. The determination that the additional processing time equals three symbols may be based at least in part on determining that a processing capability of the UE is a second type, a PDSCH mapping of the PDSCH is a mapping type B, two PDSCH symbols are allocated, the identified PDCCH candidate is associated with a three-symbol CORESET, the CORESET and the PDSCH have a same starting symbol, and a metric corresponding to the identified PDCCH candidate partially determines the value of the parameter. For example, if the PDSCH is mapping type B, if the number of PDSCH symbols allocated is 2, if the PDCCH candidate x corresponding to the determined $d^x$ was in a 3-symbol CORESET and the CORSET and the PDSCH had the same starting symbol, and if $d^x$ partially determines d, then $d_{1,1}=3$.

As shown by reference number 630, the UE 605 may transmit, and the base station 610 may receive, a HARQ-ACK feedback. The HARQ-ACK feedback may be associated with a first symbol of a PUCCH based at least in part on determining the processing time and the additional processing time.

As indicated above, FIG. 6 is provided as an example. Other examples may differ from what is described with regard to FIG. 6. For example, in some aspects, a reference symbol and/or reference PDCCH repetition may be specified, configured, and/or dynamically indicated.

FIGS. 7A-7D are diagrams illustrating examples 700, 710, 720, and 730 associated with UE processing time for a PDSCH scheduled using DCI repetition, in accordance with the present disclosure. Examples 700, 710, 720, and 730 each illustrate a slot having a different scenario for illustrating examples of determining additional processing time $d_{1,1}$ based on the different procedures for determining the value of the parameter d discussed above in connection with FIG. 6.

For the purposes of illustrating the different calculations described above, the different calculations may be described in terms of a number of different calculation options, some having alternatives. For example, the procedures described above may be represented as a set of rules that state that when a UE receives a DCI in PDCCH candidates that are linked for repetition scheduling PDSCH, $N_1+d_{1,1}$ symbols for a PDSCH processing starts after the last symbol of the PDSCH transmission, and d is determined according to one of a set of rules. In a first rule, (indicated as Option 1), if $d^1$ is the number of overlapping symbols of the first PDCCH candidate and the scheduled PDSCH and $d^2$ is the number of overlapping symbols of the second PDCCH candidate and the scheduled PDSCH, d is a function of $d^1$ and $d^2$.

In a first sub-rule (indicated as Alt 1) of Option 1, $d=d^x$, $x \in \{1,2\}$, where $d^x$ corresponds to the later PDCCH candidate. In some aspects, according to a sub-sub-rule (indicated as Alt 1-1), the later PDCCH is defined as the PDCCH with the later starting symbol. In some aspects, according to a sub-sub-rule (indicated as Alt 1-2), the later PDCCH is defined as the PDCCH with the later ending symbol. In some aspects, according to a second sub-rule (indicated as Alt 2) of Option 1, $d=d^x$, $x \in \{1,2\}$, where $d^x$ corresponds to the earlier PDCCH candidate. In some aspects, according to a sub-sub-rule (indicated as Alt 1-2), the earlier PDCCH is defined as the PDCCH with the earlier starting symbol. In some aspects, according to a sub-sub-rule (indicated as Alt 2-2), the earlier PDCCH is defined as the PDCCH with the earlier ending symbol. In some aspects, according to a sub-rule (indicated as Alt 3), $d=d^1+d^2$. In some aspects, according to a sub-rule (indicated as Alt 4), $d=\max(d^1, d^2)$. In some aspects, according to a sub-rule (indicated as Alt 5), $d=\min(d^1, d^2)$.

In some aspects, according to a second rule (Indicated as Option 2), the value of the parameter d comprises the number of overlapping symbols of the both PDCCH candidates and the scheduled PDSCH. In some aspects, the value of the parameter d comprises the number of PDSCH symbols that overlap with either first candidate or second candidate. For the above options, $d_{1,1}$ may be calculated according to the rules described above in connection with FIGS. 4A-4E, based on the determined d.

Example 700 illustrates a scenario in which two PDSCH symbols are allocated, the PDSCH is mapping type B, and the first PDCCH candidate completely overlaps the PDSCH, while the second candidate occurs one symbol earlier and only partially overlaps the PDSCH. The various values of d and corresponding values of the additional processing $d_{1,1}$ are shown for the options and alternatives described above.

Example 710 illustrates a scenario in which four PDSCH symbols are allocated, the PDSCH is mapping type B, and the first PDCCH candidate partially overlaps the PDSCH (by two symbols), while the second candidate occurs one symbol earlier and only partially overlaps the PDSCH (by one symbol). The various values of d and corresponding values of the additional processing $d_{1,1}$ are shown for the options and alternatives described above.

Example 720 illustrates a scenario in which two PDSCH symbols are allocated, the PDSCH is mapping type B, the first PDCCH candidate completely overlaps the PDSCH (by two symbols) and includes a three-symbol CORESET having a same starting symbol as the PDSCH. The various values of d and corresponding values of the additional processing $d_{1,1}$ are shown for the options and alternatives described above, which invoke the special case described above in connection with FIG. 6.

Example 730 illustrates a scenario in which four PDSCH symbols are allocated, the PDSCH is mapping type B, the first PDCCH candidate partially overlaps the PDSCH (by two symbols) and includes a three-symbol CORESET having a different starting symbol than the PDSCH. The various values of d and corresponding values of the additional processing $d_{1,1}$ are shown for the options and alternatives described above.

As indicated above, FIGS. 7A-7D are provided as examples. Other examples may differ from what is described with regard to FIGS. 7A-7D. For example, in some aspects, other scenarios associated with allocated PDSCH symbols, PDCCH repetitions and/or overlapping of symbols may be implemented, in which the rules may provide different outcomes.

Figure 8:
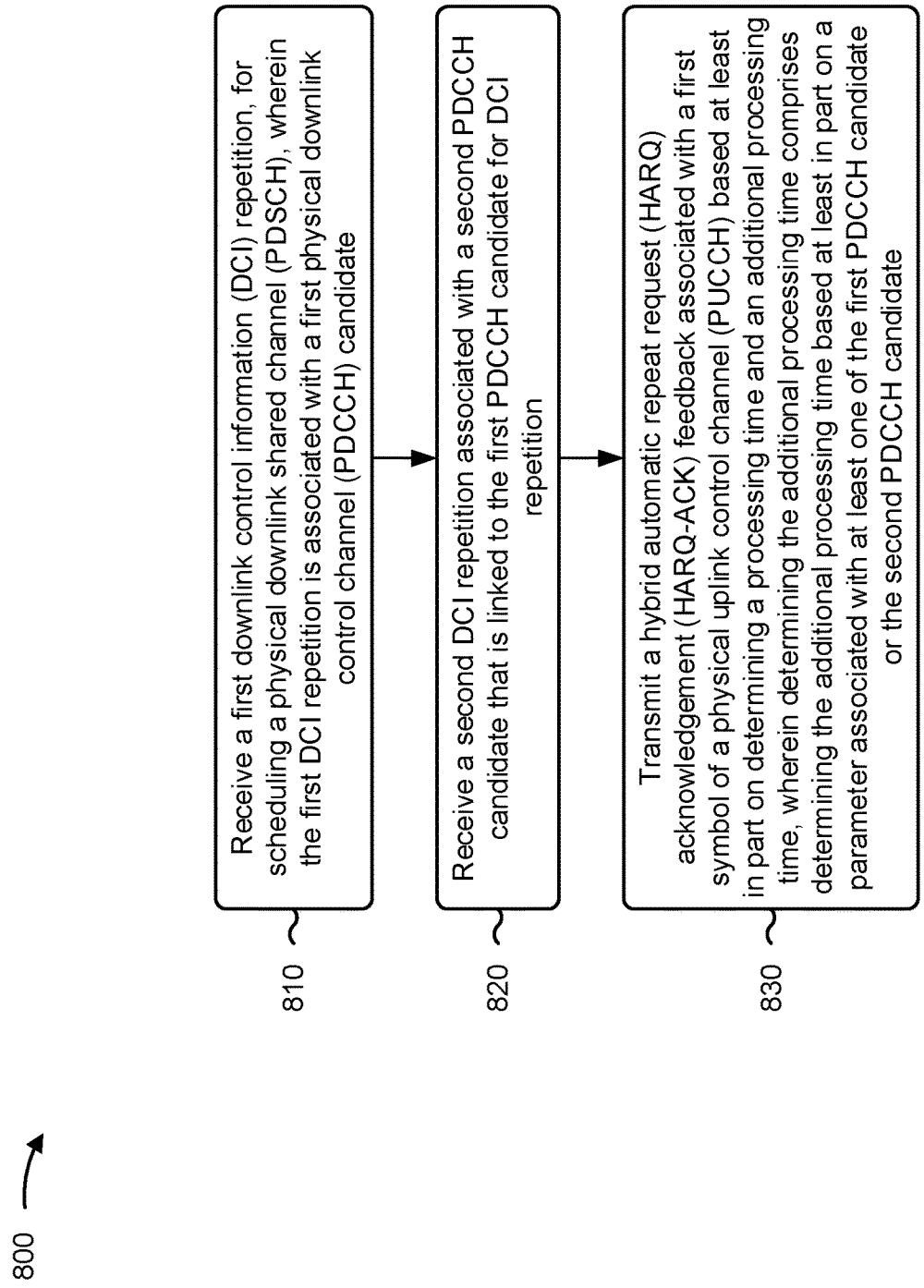
FIG. 8 is a diagram illustrating an example process associated with UE processing time for a PDSCH scheduled using DCI repetition, in accordance with the present disclosure.

FIG. 8 is a diagram illustrating an example process 800 performed, for example, by a UE, in accordance with the present disclosure. Example process 800 is an example where the UE (e.g., UE 605) performs operations associated with UE processing time for a PDSCH scheduled using DCI repetition.

As shown in FIG. 8, in some aspects, process 800 may include receiving a first DCI repetition, for scheduling a PDSCH, wherein the first DCI repetition is associated with a first PDCCH candidate (block 810). For example, the UE (e.g., using reception component 902, depicted in FIG. 9) may receive a first DCI repetition, for scheduling a PDSCH, wherein the first DCI repetition is associated with a first PDCCH candidate, as described above.

As further shown in FIG. 8, in some aspects, process 800 may include receiving a second DCI repetition associated with a second PDCCH candidate that is linked to the first PDCCH candidate for DCI repetition (block 820). For example, the UE (e.g., using reception component 902, depicted in FIG. 9) may receive a second DCI repetition associated with a second PDCCH candidate that is linked to the first PDCCH candidate for DCI repetition, as described above.

As further shown in FIG. 8, in some aspects, process 800 may include transmitting a HARQ-ACK feedback associated with a first symbol of a PUCCH based at least in part on determining a processing time and an additional processing time, wherein determining the additional processing time comprises determining the additional processing time based at least in part on a parameter associated with at least one of the first PDCCH candidate or the second PDCCH candidate (block 830). For example, the UE (e.g., using transmission component 904, depicted in FIG. 9) may transmit a HARQ-ACK feedback associated with a first symbol of a PUCCH based at least in part on determining a processing time and an additional processing time, wherein determining the additional processing time comprises determining the additional processing time based at least in part on a parameter associated with at least one of the first PDCCH candidate or the second PDCCH candidate, as described above.

Process 800 may include additional aspects, such as any single aspect or any combination of aspects described below and/or in connection with one or more other processes described elsewhere herein.

In a first aspect, determining the additional processing time comprises determining a value of the parameter by determining a first metric that indicates a number of overlapping symbols of the first PDCCH candidate and the PDSCH, determining a second metric that indicates a number of overlapping symbols of the second PDCCH candidate and the PDSCH, and evaluating a function of the first metric and the second metric.

In a second aspect, alone or in combination with the first aspect, the function of the first metric and the second metric is based at least in part on an identified PDCCH candidate, and determining the additional processing time comprises determining that the additional processing time equals three symbols based at least in part on determining that a processing capability of the UE comprises a second type, determining that a PDSCH mapping of the PDSCH comprises a mapping type B, determining that two PDSCH symbols are allocated, determining that the identified PDCCH candidate is associated with a three-symbol CORESET, determining that the CORESET and the PDSCH have a same starting symbol, and determining that a metric corresponding to the identified PDCCH candidate partially determines the value of the parameter.

In a third aspect, alone or in combination with one or more of the first and second aspects, evaluating the function of the first metric and the second metric comprises determining the metric, of the first metric and the second metric, that corresponds to a later PDCCH candidate of the first PDCCH candidate and the second PDCCH candidate.

In a fourth aspect, alone or in combination with the third aspect, determining the later PDCCH candidate comprises determining the PDCCH candidate, of the first PDCCH candidate and the second PDCCH candidate, that has a later starting symbol.

In a fifth aspect, alone or in combination with one or more of the third through fourth aspects, determining the later PDCCH candidate comprises determining the PDCCH candidate, of the first PDCCH candidate and the second PDCCH candidate, that has a later ending symbol.

In a sixth aspect, alone or in combination with one or more of the first through fifth aspects, evaluating the function of the first metric and the second metric comprises determining the metric, of the first metric and the second metric, that corresponds to an earlier PDCCH candidate of the first PDCCH candidate and the second PDCCH candidate.

In a seventh aspect, alone or in combination with the sixth aspect, determining the earlier PDCCH candidate comprises determining the PDCCH candidate, of the first PDCCH candidate and the second PDCCH candidate, that has an earlier starting symbol.

In an eighth aspect, alone or in combination with one or more of the sixth through seventh aspects, determining the earlier PDCCH candidate comprises determining the PDCCH candidate, of the first PDCCH candidate and the second PDCCH candidate, that has an earlier ending symbol.

In a ninth aspect, alone or in combination with one or more of the first through eighth aspects, evaluating the function of the first metric and the second metric comprises determining a sum of the first metric and the second metric.

In a tenth aspect, alone or in combination with one or more of the first through ninth aspects, evaluating the function of the first metric and the second metric comprises determining a maximum of the first metric and the second metric.

In an eleventh aspect, alone or in combination with one or more of the first through tenth aspects, evaluating the function of the first metric and the second metric comprises determining a minimum of the first metric and the second metric.

In a twelfth aspect, alone or in combination with one or more of the first through eleventh aspects, determining the additional processing time comprises determining a number of overlapping symbols of an intersection of a first set of symbols and a second set of symbols, the first set of symbols comprising a set of symbols overlapping the first PDCCH candidate and the PDSCH, and the second set of symbols comprising a set of symbols overlapping the second PDCCH candidate and the PDSCH.

In a thirteenth aspect, alone or in combination with one or more of the first through twelfth aspects, determining the additional processing time comprises determining a number of overlapping symbols of a union of a first set of symbols and a second set of symbols, the first set of symbols comprising a set of symbols overlapping the first PDCCH candidate and the PDSCH, and the second set of symbols comprising a set of symbols overlapping the second PDCCH candidate and the PDSCH.

In a fourteenth aspect, alone or in combination with the thirteenth aspect, the function of the first metric and the second metric is based at least in part on an identified PDCCH candidate, and determining the additional processing time comprises determining that the additional processing time equals three symbols based at least in part on determining that a processing capability of the UE comprises a second type, determining that a PDSCH mapping of the PDSCH comprises a mapping type B, determining that two PDSCH symbols are allocated, determining that the identified PDCCH candidate is associated with a three-symbol CORESET, determining that the CORESET and the PDSCH have a same starting symbol, and determining that a metric corresponding to the identified PDCCH candidate partially determines the value of the parameter.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
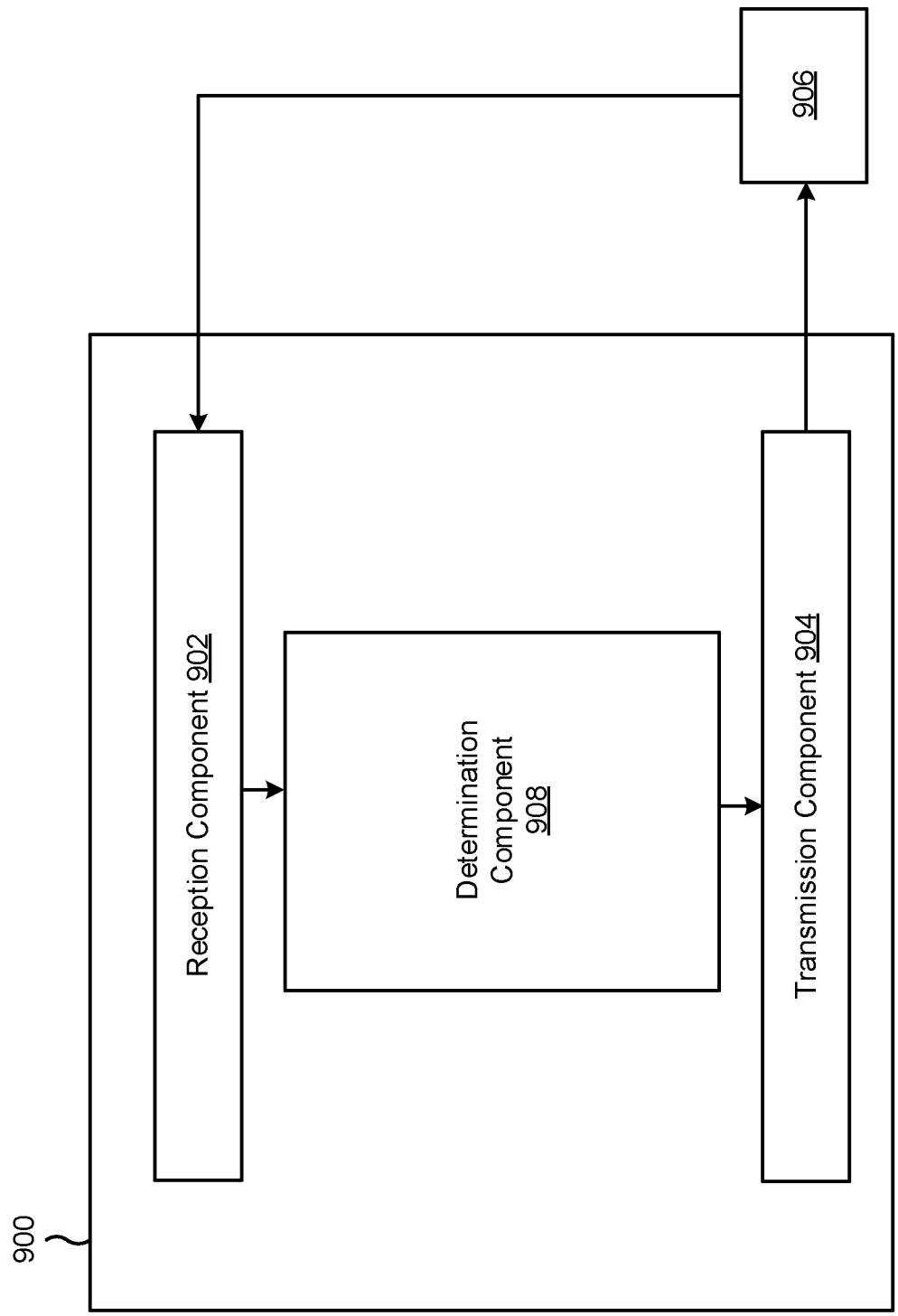
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIGS. 6 and 7A-7D. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive a first DCI repetition, for scheduling a PDSCH, wherein the first DCI repetition is associated with a first PDCCH candidate. The reception component 902 may receive a second DCI repetition associated with a second PDCCH candidate that is linked to the first PDCCH candidate for DCI repetition. The transmission component 904 may transmit a HARQ-ACK feedback associated with a first symbol of a PUCCH based at least in part on determining a processing time and an additional processing time, wherein determining the additional processing time comprises determining the additional processing time based at least in part on a parameter associated with at least one of the first PDCCH candidate or the second PDCCH candidate.

The determination component 908 may determine the processing time and the additional processing time based at least in part on a parameter associated with at least one of the first PDCCH candidate or the second PDCCH candidate. In some aspects, the determination component 908 may include one or more antennas, a demodulator, a MIMO detector, a receive processor, a controller/processor, a memory, or a combination thereof, of the UE described above in connection with FIG. 2. In some aspects, the determination component 908 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a first downlink control information (DCI) repetition, for scheduling a physical downlink shared channel (PDSCH), wherein the first DCI repetition is associated with a first physical downlink control channel (PDCCH) candidate; receiving a second DCI repetition associated with a second PDCCH candidate that is linked to the first PDCCH candidate for DCI repetition; and transmitting a hybrid automatic repeat request (HARD) acknowledgement (HARQ-ACK) feedback associated with a first symbol of a physical uplink control channel (PUCCH) based at least in part on determining a processing time and an additional processing time, wherein determining the additional processing time comprises determining the additional processing time based at least in part on a parameter associated with at least one of the first PDCCH candidate or the second PDCCH candidate.

Aspect 2: The method of Aspect 1, wherein determining the additional processing time comprises determining a value of the parameter by: determining a first metric that indicates a number of overlapping symbols of the first PDCCH candidate and the PDSCH; determining a second metric that indicates a number of overlapping symbols of the second PDCCH candidate and the PDSCH; and evaluating a function of the first metric and the second metric.

Aspect 3: The method of Aspect 2, wherein the function of the first metric and the second metric is based at least in part on an identified PDCCH candidate, and wherein determining the additional processing time comprises determining that the additional processing time equals three symbols based at least in part on: determining that a processing capability of the UE comprises a second type; determining that a PDSCH mapping of the PDSCH comprises a mapping type B; determining that two PDSCH symbols are allocated; determining that the identified PDCCH candidate is associated with a three-symbol core resource set (CORESET); determining that the CORESET and the PDSCH have a same starting symbol; and determining that a metric corresponding to the identified PDCCH candidate partially determines the value of the parameter.

Aspect 4: The method of either of Aspects 2 or 3, wherein evaluating the function of the first metric and the second metric comprises determining the metric, of the first metric and the second metric, that corresponds to a later PDCCH candidate of the first PDCCH candidate and the second PDCCH candidate.

Aspect 5: The method of Aspect 4, wherein determining the later PDCCH candidate comprises determining the PDCCH candidate, of the first PDCCH candidate and the second PDCCH candidate, that has a later starting symbol.

Aspect 6: The method of either of Aspects 4 or 5, wherein determining the later PDCCH candidate comprises determining the PDCCH candidate, of the first PDCCH candidate and the second PDCCH candidate, that has a later ending symbol.

Aspect 7: The method of any of Aspects 2-6, wherein evaluating the function of the first metric and the second metric comprises determining the metric, of the first metric and the second metric, that corresponds to an earlier PDCCH candidate of the first PDCCH candidate and the second PDCCH candidate.

Aspect 8: The method of Aspect 7, wherein determining the earlier PDCCH candidate comprises determining the PDCCH candidate, of the first PDCCH candidate and the second PDCCH candidate, that has an earlier starting symbol.

Aspect 9: The method of either of Aspects 7 or 8, wherein determining the earlier PDCCH candidate comprises determining the PDCCH candidate, of the first PDCCH candidate and the second PDCCH candidate, that has an earlier ending symbol.

Aspect 10: The method of any of Aspects 2-9, wherein evaluating the function of the first metric and the second metric comprises determining a sum of the first metric and the second metric.

Aspect 11: The method of any of Aspects 2-10, wherein evaluating the function of the first metric and the second metric comprises determining a maximum of the first metric and the second metric.

Aspect 12: The method of any of Aspects 2-11, wherein evaluating the function of the first metric and the second metric comprises determining a minimum of the first metric and the second metric.

Aspect 13: The method of any of Aspects 1-12, wherein determining the additional processing time comprises determining a number of overlapping symbols of an intersection of a first set of symbols and a second set of symbols, the first set of symbols comprising a set of symbols overlapping the first PDCCH candidate and the PDSCH, and the second set of symbols comprising a set of symbols overlapping the second PDCCH candidate and the PDSCH.

Aspect 14: The method of any of Aspects 1-13, wherein determining the additional processing time comprises determining a number of overlapping symbols of a union of a first set of symbols and a second set of symbols, the first set of symbols comprising a set of symbols overlapping the first PDCCH candidate and the PDSCH, and the second set of symbols comprising a set of symbols overlapping the second PDCCH candidate and the PDSCH.

Aspect 15: The method of Aspect 14, wherein a function of a first metric indicating a number of symbols in the first set of symbols and a second metric indicating a number of symbols in the second set of symbols is based at least in part on an identified PDCCH candidate, and wherein determining the additional processing time comprises determining that the additional processing time equals three symbols based at least in part on: determining that a processing capability of the UE comprises a second type; determining that a PDSCH mapping of the PDSCH comprises a mapping type B; determining that two PDSCH symbols are allocated; determining that the identified PDCCH candidate is associated with a three-symbol core resource set (CORESET); determining that the CORESET and the PDSCH have a same starting symbol; and determining that a metric corresponding to the identified PDCCH candidate partially determines a value of the parameter.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      receive a first downlink control information (DCI) repetition, for scheduling a physical downlink shared channel (PDSCH),
         wherein the first DCI repetition is associated with a first physical downlink control channel (PDCCH) candidate, and
         wherein the PDSCH corresponds to a set of PDSCH symbols comprising a starting symbol;
      receive a second DCI repetition associated with a second PDCCH candidate that is linked to the first PDCCH candidate for DCI repetition; and
      transmit a hybrid automatic repeat request (HARQ) acknowledgement (HARQ-ACK) feedback associated with a first symbol of a physical uplink control channel (PUCCH) based at least in part on determining a processing time and an additional processing time,
         wherein the processing time corresponds to a first quantity of symbols and the additional processing time corresponds to a second quantity of symbols,
         wherein a quantity of symbols between a last symbol of the set of PDSCH symbols and the first symbol of the PUCCH corresponds to a sum of the first quantity of symbols and the second quantity of symbols,
         wherein the processing time starts after the last symbol of the set of PDSCH symbols,
         wherein the one or more processors, to determine the additional processing time, are configured to determine the additional processing time based at least in part on determining a value of a parameter associated with at least one of the first PDCCH candidate or the second PDCCH candidate in accordance with a demodulation reference signal (DMRS) symbol being the starting symbol of the set of PDSCH symbols,
         wherein the first PDCCH candidate and the second PDCCH candidate overlap the DMRS symbol, and wherein the one or more processors, to determine the
value of the parameter, are configured to:
determine a first metric that indicates a number of
overlapping symbols of the first PDCCH candidate and the PDCCH;
determine a second metric that indicates a number
of overlapping symbols of the second PDCCH
candidate and the PDSCH; and
evaluate a function of the first metric and the
second metric, wherein the one or more processors, to evaluate the function of the first metric
and the second metric, are configured to determine a maximum of the first metric and the
second metric.

2. The UE of claim 1, wherein the function of the first metric and the second metric is based at least in part on an identified PDCCH candidate, and wherein the one or more processors, to determine the additional processing time are configured to determine that the additional processing time equals two symbols, and wherein the one or more processors, to determine that the additional processing time equals two symbols, are configured to:
determine that a processing capability of the UE comprises a second type;
determine that a PDSCH mapping of the PDSCH comprises a mapping type B;
determine that a length of the set of PDSCH symbols is greater than or equal to two symbols and less than or equal to six symbols;
determine that the first PDCCH candidate partially overlaps the PDSCH by two symbols;
determine that the second PDCCH candidate only partially overlaps the PDSCH by one symbol:
determine that the identified PDCCH candidate is associated with a three-symbol core resource set (CORESET); and
determine that the first PDCCH candidate has a different starting symbol than the set of PDSCH symbols.

3. The UE of claim 1, wherein the additional processing time is determined based at least in part on determining that a length of the set of PDSCH symbols is greater than or equal to three symbols and less than or equal to six symbols.

4. The UE of claim 1, wherein to determine the additional processing time, the one or more processors are configured to:
determine that a length of the set of PDSCH symbols is equal to two symbols;
determine that a processing capability of the UE comprises a second type; and
determine that the first PDCCH candidate and the second PDCCH candidate have different starting symbols than the starting symbol of the set of PDSCH symbols.

5. The UE of claim 1, wherein the first PDCCH candidate and the second PDCCH candidate comprise a different number of overlapping symbols with the PDSCH.

6. The UE of claim 1, wherein the function of the first metric and the second metric is based at least in part on an identified PDCCH candidate, and wherein the one or more processors, to determine the additional processing time are configured to determine that the additional processing time equals three symbols.

7. The UE of claim 6, wherein the one or more processors, to determine that the additional processing time equals three symbols, are configured to:
determine that a processing capability of the UE comprises a first type;
determine that a PDSCH mapping of the PDSCH comprises a mapping type B; and
determine that a length of the set of PDSCH symbols is equal to four symbols.

8. The UE of claim 6, wherein the one or more processors, to determine that the additional processing time equals three symbols, are configured to:
determine that a processing capability of the UE comprises a second type;
determine that a PDSCH mapping of the PDSCH comprises a mapping type B;
determine that a length of the set of PDSCH symbols is equal to three symbols; and
determine that the first PDCCH candidate completely overlaps the PDSCH.

9. The UE of claim 6, wherein the PDSCH, the HARQ-ACK feedback, the processing time, and the additional processing time, corresponding to the first DCI repetition and the second DCI repetition, comprise a first PDSCH, a first HARQ-ACK feedback, a first processing time, and a first additional processing time,
wherein the one or more processors are configured to:
receive a third DCI repetition, for scheduling a second PDSCH, wherein the third DCI repetition is associated with a third PDCCH candidate;
receive a fourth DCI repetition associated with a fourth PDCCH candidate that is linked to the third PDCCH candidate for DCI repetition; and
transmit a second HARQ-ACK feedback based at least in part on determining a second processing time and a second additional processing time,
wherein the one or more processors, to determine the second additional processing time, are configured to determine that the second additional processing time equals two symbols, wherein the one or more processors, to determine that the second additional processing time equals two symbols, are configured to:
determine that a PDSCH mapping of the second PDSCH comprises a mapping type A; and
determine that a last symbol of the second PDSCH is on a fifth symbol of a slot corresponding to the second PDSCH, and
wherein the first processing time and the second processing time are the same and are based at least in part on a subcarrier spacing.

10. A method of wireless communication performed by a user equipment (UE), comprising:
receiving a first downlink control information (DCI) repetition, for scheduling a physical downlink shared channel (PDSCH),
wherein the first DCI repetition is associated with a first physical downlink control channel (PDCCH) candidate, and
wherein the PDSCH corresponds to a set of PDSCH symbols comprising a starting symbol;
receiving a second DCI repetition associated with a second PDCCH candidate that is linked to the first PDCCH candidate for DCI repetition; and
transmitting a hybrid automatic repeat request (HARQ) acknowledgement (HARQ-ACK) feedback associated with a first symbol of a physical uplink control channel (PUCCH) based at least in part on determining a processing time and an additional processing time,
wherein the processing time corresponds to a first quantity of symbols and the additional processing time corresponds to a second quantity of symbols, wherein a quantity of symbols between a last symbol of the set of PDSCH symbols and the first symbol of the PUCCH corresponds to a sum of the first quantity of symbols and the second quantity of symbols, wherein the processing time starts after the last symbol of the set of PDSCH symbols, wherein determining the additional processing time comprises determining the additional processing time based at least in part on determining a value of a parameter associated with at least one of the first PDCCH candidate or the second PDCCH candidate in accordance with a demodulation reference signal (DMRS) symbol being the starting symbol of the set of PDSCH symbols, wherein the first PDCCH candidate and the second PDCCH candidate overlap the DMRS symbol, and wherein determining the value of the parameter comprises:
   determining a first metric that indicates a number of overlapping symbols of the first PDCCH candidate and the PDSCH;
   determining a second metric that indicates a number of overlapping symbols of the second PDCCH candidate and the PDSCH; and
   evaluating a function of the first metric and the second metric, wherein evaluating the function of the first metric and the second metric comprises determining a maximum of the first metric and the second metric.

11. The method of claim 10, wherein the function of the first metric and the second metric is based at least in part on an identified PDCCH candidate, and wherein determining the additional processing time comprises determining that the additional processing time equals two symbols based at least in part on:
   determining that a processing capability of the UE comprises a second type;
   determining that a PDSCH mapping of the PDSCH comprises a mapping type B;
   determining that a length of the set of PDSCH symbols is greater than or equal to two symbols and less than or equal to six symbols;
   determining that the first PDCCH candidate partially overlaps the PDSCH by two symbols;
   determining that the second PDCCH candidate only partially overlaps the PDSCH by one symbol;
   determining that the identified PDCCH candidate is associated with a three-symbol core resource set (CORESET); and
   determining that the first PDCCH candidate has a different starting symbol than the set of PDSCH symbols.

12. The method of claim 10, wherein the additional processing time is determined based at least in part on determining that a length of the set of PDSCH symbols is greater than or equal to three symbols and less than or equal to six symbols.

13. The method of claim 10, wherein the first PDCCH candidate and the second PDCCH candidate comprise a different number of overlapping symbols with the PDSCH.

14. The method of claim 10, wherein the function of the first metric and the second metric is based at least in part on an identified PDCCH candidate, wherein determining the additional processing time comprises determining that the additional processing time equals three symbols, and wherein determining that the additional processing time equals three symbols comprises:
   determining that a processing capability of the UE comprises a second type;
   determining that a PDSCH mapping of the PDSCH comprises a mapping type B;
   determining that a length of the set of PDSCH symbols is equal to three symbols; and
   determining that the first PDCCH candidate completely overlaps the PDSCH.

15. A user equipment (UE) for wireless communication, comprising:
   one or more memories; and
   one or more processors, coupled to the one or more memories, configured to:
      receive a first downlink control information (DCI) repetition, for scheduling a physical downlink shared channel (PDSCH), wherein the first DCI repetition is associated with a first physical downlink control channel (PDCCH) candidate,
      receive a second DCI repetition associated with a second PDCCH candidate that is linked to the first PDCCH candidate for DCI repetition; and
      transmit a hybrid automatic repeat request (HARQ) acknowledgement (HARQ-ACK) feedback associated with a first symbol of a physical uplink control channel (PUCCH) based at least in part on determining a processing time and an additional processing time,
   wherein the one or more processors, to determine the additional processing time, are configured to determine the additional processing time based at least in part on determining a value of a parameter associated with at least one of the first PDCCH candidate or the second PDCCH candidate,
   wherein the first PDCCH candidate and the second PDCCH candidate overlap a first symbol of the PDSCH corresponding to a demodulation reference signal (DMRS) symbol of the PDSCH, and
   wherein the one or more processors, to determine the value of the parameter, are configured to:
      determine a first metric that indicates a number of overlapping symbols of the first PDCCH candidate and the PDSCH;
      determine a second metric that indicates a number of overlapping symbols of the second PDCCH candidate and the PDSCH; and
      evaluate a function of the first metric and the second metric, wherein the one or more processors, to evaluate the function of the first metric and the second metric, are configured to determine a maximum of the first metric and the second metric.

16. The UE of claim 15, wherein the function of the first metric and the second metric is based at least in part on an identified PDCCH candidate, and wherein the one or more processors, to determine the additional processing time are configured to determine that the additional processing time equals two symbols, and wherein the one or more processors, to determine that the additional processing time equals two symbols, are configured to:
   determine that a processing capability of the UE comprises a second type;
   determine that a PDSCH mapping of the PDSCH comprises a mapping type B;
   determine that two PDSCH symbols are allocated;
   determine that the first PDCCH candidate partially overlaps the PDSCH by two symbols;
   determine that the second PDCCH candidate only partially overlaps the PDSCH by one symbol;

determine that the identified PDCCH candidate is associated with a three-symbol core resource set (CORESET); and determine that the CORESET and the PDSCH have different starting symbols.

17. The UE of claim 15, wherein the additional processing time is determined based at least in part on determining that greater than or equal to three PDSCH symbols and less than or equal to six PDSCH symbols are allocated.

18. The UE of claim 15, wherein the additional processing time is determined based at least in part on:
determining that two PDSCH symbols are allocated;
determining that a processing capability of the UE comprises a second type; and
determining that the first PDCCH candidate and the second PDCCH candidate have different starting symbols than the first symbol of the PDSCH.

19. The UE of claim 15, wherein the first PDCCH candidate and the second PDCCH candidate comprise a different number of overlapping symbols with the PDSCH.

20. The UE of claim 15, wherein the function of the first metric and the second metric is based at least in part on an identified PDCCH candidate, and wherein the one or more processors, to determine the additional processing time are configured to determine that the additional processing time equals three symbols.

21. The UE of claim 20, wherein the one or more processors, to determine that the additional processing time equals three symbols, are configured to:
determine that a processing capability of the UE comprises a first type;
determine that a PDSCH mapping of the PDSCH comprises a mapping type B; and
determine that four PDSCH symbols are allocated.

22. The UE of claim 20, wherein the one or more processors, to determine that the additional processing time equals three symbols, are configured to:
determine that a processing capability of the UE comprises a second type;
determine that a PDSCH mapping of the PDSCH comprises a mapping type B;
determine that three PDSCH symbols are allocated; and
determine that the first PDCCH candidate completely overlaps the PDSCH.

23. An apparatus for wireless communication, comprising:
means for receiving a first downlink control information (DCI) repetition, for scheduling a physical downlink shared channel (PDSCH),
wherein the first DCI repetition is associated with a first physical downlink control channel (PDCCH) candidate, and
wherein the PDSCH corresponds to a set of PDSCH symbols comprising a starting symbol;
means for receiving a second DCI repetition associated with a second PDCCH candidate that is linked to the first PDCCH candidate for DCI repetition;
means for determining a processing time and means for determining an additional processing time, wherein the means for determining the additional processing time comprise means for determining the additional processing time based at least in part on a parameter associated with at least one of the first PDCCH candidate or the second PDCCH candidate; and
means for transmitting a hybrid automatic repeat request (HARQ) acknowledgement (HARQ-ACK) feedback associated with a first symbol of a physical uplink control channel (PUCCH) based at least in part on the processing time and the additional processing time,
wherein the processing time corresponds to a first quantity of symbols and the additional processing time corresponds to a second quantity of symbols,
wherein a quantity of symbols between a last symbol of the set of PDSCH symbols and the first symbol of the PUCCH corresponds to a sum of the first quantity of symbols and the second quantity of symbols,
wherein the processing time starts after the last symbol of the set of PDSCH symbols in accordance with a demodulation reference signal (DMRS) symbol being the starting symbol of the set of PDSCH symbols,
wherein the first PDCCH candidate and the second PDCCH candidate overlap the DMRS symbol, and
wherein the means for determining the additional processing time comprise means for determining a value of the parameter, wherein the means for determining the value of the parameter comprise:
means for determining a first metric that indicates a number of overlapping symbols of the first PDCCH candidate and the PDSCH;
means for determining a second metric that indicates a number of overlapping symbols of the second PDCCH candidate and the PDSCH; and
means for evaluating a function of the first metric and the second metric, wherein the means for evaluating the function of the first metric and the second metric comprises means for determining a maximum of the first metric and the second metric.

24. The apparatus of claim 23, wherein the additional processing time is determined based at least in part on determining that a length of the set of PDSCH symbols is greater than or equal to three symbols and less than or equal to six symbols.

25. The apparatus of claim 23, wherein the means for determining the additional processing time comprise:
means for determining that a length of the set of PDSCH symbols is equal to two symbols;
means for determining that a processing capability of the apparatus comprises a second type; and
means for determining that the first PDCCH candidate and the second PDCCH candidate have different starting symbols than the starting symbol of the set of PDSCH symbols.

26. The apparatus of claim 23, wherein the first PDCCH candidate and the second PDCCH candidate comprise a different number of overlapping symbols with the PDSCH.

27. The apparatus of claim 23, wherein the function of the first metric and the second metric is based at least in part on an identified PDCCH candidate, and wherein the means for determining the additional processing time comprise means for determining that the additional processing time equals three symbols.

28. The apparatus of claim 27, wherein the means for determining that the additional processing time equals three symbols comprise:
means for determining that a processing capability of the apparatus comprises a first type;
means for determining that a PDSCH mapping of the PDSCH comprises a mapping type B; and
means for determining that a length of the set of PDSCH symbols is equal to four symbols.

29. The apparatus of claim 27, wherein the means for determining that the additional processing time equals three symbols comprise:
- means for determining that a processing capability of the apparatus comprises a second type;
- means for determining that a PDSCH mapping of the PDSCH comprises a mapping type B;
- means for determining that a length of the set of PDSCH symbols is equal to three symbols; and
- means for determining that the first PDCCH candidate completely overlaps the PDSCH.

30. The apparatus of claim 27, wherein the PDSCH, the HARQ-ACK feedback, the processing time, and the additional processing time, corresponding to the first DCI repetition and the second DCI repetition, comprise a first PDSCH, a first HARQ-ACK feedback, a first processing time, and a first additional processing time,
- wherein the apparatus comprises:
  - means for receiving a third DCI repetition, for scheduling a second PDSCH, wherein the third DCI repetition is associated with a third PDCCH candidate;
  - means for receiving a fourth DCI repetition associated with a fourth PDCCH candidate that is linked to the third PDCCH candidate for DCI repetition; and
  - means for determining a second processing time and means for determining a second additional processing time, wherein the means for determining the second additional processing time comprise means for determining that the second additional processing time equals two symbols, wherein the means for determining that the second additional processing time equals two symbols comprise:
    - means for determining that a PDSCH mapping of the second PDSCH comprises a mapping type A; and
    - means for determining that a last symbol of the second PDSCH is on a fifth symbol of a slot corresponding to the second PDSCH, and
    - wherein the first processing time and the second processing time are the same; and
- means for transmitting a second HARQ-ACK feedback based at least in part on the second processing time and the second additional processing time.

* * * * *